US010110896B2

(12) United States Patent
Wang et al.

(10) Patent No.: US 10,110,896 B2
(45) Date of Patent: Oct. 23, 2018

(54) ADAPTIVE MOTION JPEG ENCODING METHOD AND SYSTEM

(71) Applicant: Zhuhai Jieli Technology Co., Ltd., Guangdong Province (CN)

(72) Inventors: Guibin Wang, Guangdong Province (CN); Jiada Chen, Guangdong Province (CN)

(73) Assignee: Zhuhai Jieli Technology Co., Ltd., Guangdong Province (CN)

( * ) Notice: Subject to any disclaimer, the term of this patent is extended or adjusted under 35 U.S.C. 154(b) by 322 days.

(21) Appl. No.: 15/010,171

(22) Filed: Jan. 29, 2016

(65) Prior Publication Data
US 2016/0366403 A1  Dec. 15, 2016

(30) Foreign Application Priority Data

Jun. 15, 2015  (CN) .......................... 2015 1 0330153
Aug. 5, 2015   (CN) .......................... 2015 1 0474990

(51) Int. Cl.
*H04N 19/11* (2014.01)
*H04N 19/13* (2014.01)
(Continued)

(52) U.S. Cl.
CPC ............. *H04N 19/11* (2014.11); *H04N 19/13* (2014.11); *H04N 19/137* (2014.11);
(Continued)

(58) Field of Classification Search
CPC ...... H04N 19/91; H04N 19/13; H04N 19/124; H04N 19/149; H04N 19/00206;
(Continued)

(56) References Cited

U.S. PATENT DOCUMENTS 5,654,704 A * 8/1997 Tayama ................. H03M 7/42
                                                341/67
2002/0001415 A1* 1/2002 Latva-Aho ............. H04N 19/60
                                                382/251
(Continued)

FOREIGN PATENT DOCUMENTS

CN   1976394 A    6/2007
CN   101998122 A  3/2011

OTHER PUBLICATIONS

Search Report for Chinese Patent Application No. 201510474990.7, dated Sep. 19, 2017, 1 page.
(Continued)

*Primary Examiner* — Jeremiah C Hallenbeck-Huber
*Assistant Examiner* — Daniel Chang
(74) *Attorney, Agent, or Firm* — Seyfarth Shaw LLP

(57) ABSTRACT

An adaptive Motion JPEG encoding method is disclosed, including: acquiring a video sequence; encoding a current video frame of the video sequence into JPEG format based on a Huffman description table, generating encoded symbols corresponding to the current video frame and counting frequencies of occurrence of the encoded symbols corresponding to the current video frame; and updating the Huffman description table with Canonical Huffman encoding based on the frequencies of occurrence of the encoded symbols corresponding to the current video frame, the updated Huffman description table being used for encoding a next video frame adjacent to the current video frame of the video sequence into JPEG format. The adaptive Motion JPEG encoding method uses the correlation between the Huffman description tables of the adjacent frames to reduce the redundant information between the video frames. An adaptive Motion JPEG encoding system is also disclosed.

14 Claims, 9 Drawing Sheets

(51) Int. Cl.
*H04N 19/137* (2014.01)
*H04N 19/149* (2014.01)
*H04N 19/172* (2014.01)
*H04N 19/186* (2014.01)
*H04N 19/96* (2014.01)
*H04N 19/593* (2014.01)

(52) U.S. Cl.
CPC ......... *H04N 19/149* (2014.11); *H04N 19/172* (2014.11); *H04N 19/186* (2014.11); *H04N 19/96* (2014.11); *H04N 19/593* (2014.11)

(58) Field of Classification Search
CPC ...... H04N 19/172; H04N 19/60; G06T 9/005; G06T 9/007; H03M 7/40; H03M 7/42; H03M 7/425
USPC ............ 375/240.02, 240.03, 240.12, 240.25, 375/E7.144, E7.226, E7.231; 382/166, 382/244, 246, 251
See application file for complete search history.

(56) References Cited

U.S. PATENT DOCUMENTS

| | | | |
|---|---|---|---|
| 2004/0008896 A1* | 1/2004 | Suzuki | H03M 7/40 382/244 |
| 2008/0123981 A1* | 5/2008 | Moon | H04N 19/172 382/246 |
| 2010/0195739 A1* | 8/2010 | Lu | H03M 7/425 375/240.25 |
| 2014/0036993 A1* | 2/2014 | Bae | H04N 19/00206 375/240.02 |

OTHER PUBLICATIONS

First Office Action for Chinese Patent Application No. 201510474990.7, dated Sep. 19, 2017, 8 pages.

Chen, Jiada,: "Application Discussion of Dynamic Huffman Coding Between Video Frames", Computer Programming Skills & Maintenance, May 2015, part 1-4, China, 2 pages.

* cited by examiner

ADAPTIVE MOTION JPEG ENCODING METHOD AND SYSTEM

CROSS REFERENCE TO RELATED APPLICATIONS

This application is a U.S. National Stage of , and claims priority to, Chinese patent application nos. CN 201510474990.7, filed Aug. 5, 2015, and CN201510330153.7, filed Jun. 15, 2015, the disclosures of which are incorporated herein by reference.

FIELD

The present disclosure relates generally to the field of video encoding, and more particularly, to an adaptive Motion JPEG encoding method and system.

BACKGROUND

In the formation of a video signal, it is of important significance to reprocess the incoming image. Due to the large amount of data of the original image, the image compression and decompression become very important steps in the process of video encoding in order to reduce transmission bandwidth. An appropriate and efficient encoding method may effectively reduce the data storage space and improve the transmission rate of data.

Motion JPEG is a video encoding standard based on intra-frame compression, which is widely used in consumer electronics or film and television media editing due to its advantages, such as low computation complexity, low requirement of system memory and easy post-editing. Huffman encoding is a variable length encoding method, which may give a short codeword to a symbol having a high occurrence rate and give a long codeword to a symbol having a low occurrence rate to achieve compression, so Huffman encoding is often used as a main Motion JPEG encoding method. Compared with the Huffman encoding, Canonical Huffman encoding only needs to simulate the establishment of a Huffman tree without establishing a Huffman tree, which accelerates the encoding speed and improves the utilization of system memory accordingly, so the Canonical Huffman encoding is actually widely used in the encoding. The current Motion JPEG encoding technology based on the Canonical Huffman encoding mainly encodes in two primary ways: one uses the same Huffman description table (usually described as standard Huffman description table) to encode each frame, with no use of the correlation between adjacent frames, so the compression result is not satisfactory; the other is to scan twice in the same frame to generate the Huffman description table of the current frame and encode based on the generated Huffman description table, but because of the need to scan twice, it costs much system overhead, and is not beneficial to practical application.

SUMMARY

In order to solve the problems existing in traditional technologies, the present disclosure provides an adaptive Motion JPEG encoding method and system, which can reduce redundant information between video frames, take up less system memory, improve compression speed and encoding efficiency, so as to provide a practicable encoding scheme.

According to one aspect of the present disclosure, an adaptive Motion JPEG encoding method is provided, including:

acquiring a video sequence; encoding a current video frame from the video sequence into JPEG format based on a Huffman description table, generating encoded symbols corresponding to the current video frame and counting the frequencies of occurrence of the encoded symbols; and updating the Huffman description table with Canonical Huffman encoding based on the frequencies of occurrence of the encoded symbols corresponding to the current video frame, so that the updated Huffman description table is used for encoding a next video frame adjacent to the current video frame of the video sequence into JPEG format.

The adaptive Motion JPEG encoding method according to the present disclosure can use encoding information of the current vide frame to implement the updating of the Huffman description table, and encoding the next video frame adjacent to the current video frame of the video sequence into JPEG format based on the updated Huffman description table, so that the Huffman description table can dynamically adapt to encode different video frames into JPEG format. Due to the full use of the correlation between the adjacent frames, the adaptive Motion JPEG encoding method can efficiently reduce the redundant information between the video frames, improve the compression efficiency, lower costs of the system, and save cost and resources.

According to another aspect of the present disclosure, an adaptive Motion JPEG encoding system is provided, including:

an acquisition unit, configure to acquire a video sequence;

a JPEG encoding unit, configure to encode a current video frame from the video sequence output from the acquisition unit into JPEG format based on a Huffman description table, generate encoded symbols corresponding to the current video frame, and output a video compression stream;

a Huffman symbols statistic unit, configured to count the frequencies of occurrence of the encoded symbols corresponding to the current video frame; and a control unit, configured to update the Huffman description table with Canonical Huffman encoding based on the frequencies of occurrence of the encoded symbols corresponding to the current video frame, so that the updated Huffman description table is used for encoding a next video frame adjacent to the current video frame of the video sequence into JPEG format.

The adaptive Motion JPEG encoding system according to the present disclosure can use encoding information of the current vide frame to update the Huffman description table, and encoding the next video frame adjacent to the current video frame of the video sequence into JPEG format based on the updated Huffman description table, so that the Huffman description table can dynamically adapt to encode different video frames into JPEG format. Due to the full use of the correlation between the adjacent frames, the adaptive Motion JPEG encoding method can efficiently reduce the redundant information between the video frames, improve the compression efficiency, lower costs of the system, and save cost and resources. Furthermore, the encoding system can use a proprietary hardware module which can be readily integrated by and reuse the original hardware logic circuit of the JPEG encoding unit in practical applications, to count the occurrence frequency of each encoded symbol during JPEG encoding, and use software to generate an updated Huffman description table, so it can compress images more efficiently with high compression ratio while taking into account the software computation and hardware cost.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION OF THE PREFERRED EMBODIMENTS

In the following description of embodiments, reference is made to the accompanying drawings which form a part hereof, and in which it is shown by way of illustration specific embodiments of the disclosure that can be practiced. It is to be understood that other embodiments can be used and structural changes can be made without departing from the scope of the disclosed embodiments.

Figure 1:
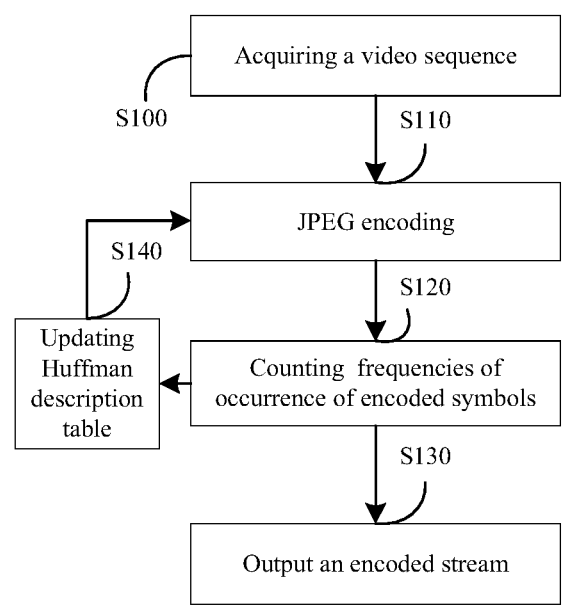
FIG. 1 is a flow diagram illustrating an adaptive Motion JPEG encoding method according to one embodiment of the present disclosure.

As shown in FIG. 1, an adaptive Motion JPEG encoding method includes:

S100, acquiring a video sequence;

S110, encoding a current video frame of the video sequence into JPEG format based on a Huffman description table, and generating encoded symbols corresponding to the current video frame;

S120, counting, while performing the step S110, the frequencies of occurrence of the encoded symbols corresponding to the current video frame;

S130, output an encoded stream of the current video frame; and

S140, updating the Huffman description table with Canonical Huffman encoding based on the frequencies of occurrence of the encoded symbols corresponding to the current video frame, the updated Huffman description table being used for encoding a next video frame adjacent to the current video frame of the video sequence into JPEG format.

Specially, a video sequence is acquired firstly, a current video frame of the video sequence is encoded into JPEG format based on a Huffman description table, to generate encoded symbols corresponding to the current video frame, and frequencies of occurrence of the encoded symbols corresponding to the current video frame are counted. The current video frame of video sequence described herein refers to a video frame being encoded into JPEG format in the video sequence, a next video frame adjacent to the current video frame refers to a next video frame following and being closest in time to the current video frame, and similarly, a previous video frame adjacent to the current video frame refers to a previous video frame followed by and being closest in time to the current video frame. For the purpose of illustration, some video frames of the video sequence described herein are named in time sequence, and are not intended to limit the scope of the present disclosure.

Secondly, the Huffman description table is updated with Canonical Huffman encoding based on the frequencies of occurrence of the encoded symbols corresponding to the current video frame. Specially, the process of updating the Huffman description table includes the step of using Canonical Huffman encoding to acquire encoding bit lengths of the corresponding encoded symbols based on the frequencies of occurrence of the encoded symbols corresponding to the current video frame, and updating the Huffman description table based on encoding bit lengths of the corresponding encoded symbols.

Finally, the next video frame adjacent to the current video frame of the video sequence is encoded into JPEG format based on the updated Huffman description table, encoded symbols corresponding to the next video frame adjacent to the current video frame are generated, frequencies of occurrence of the encoded symbols corresponding to the next video frame adjacent to the current video frame are counted, and the Huffman description table is updated again with Canonical Huffman encoding based on the frequencies of occurrence of the encoded symbols corresponding to the next video frame adjacent to the current video frame. And the like, each Huffman description table used in the JPEG encoding of each video frame following the next video frame adjacent to the current video frame is a Huffman description table updated after the encoding of the previous video frame adjacent to the video frame to be encoded. The encoding of each of the following video frames is the same as that of the current video frame, and not explained here. In the embodiment, the Motion JPEG encoding of the video sequence can make full use of the correlation between the adjacent frames, reduce the redundant information generated in the encoding of the video frames, and improve the compression speed and encoding efficiency of the video sequence.

Figure 2:
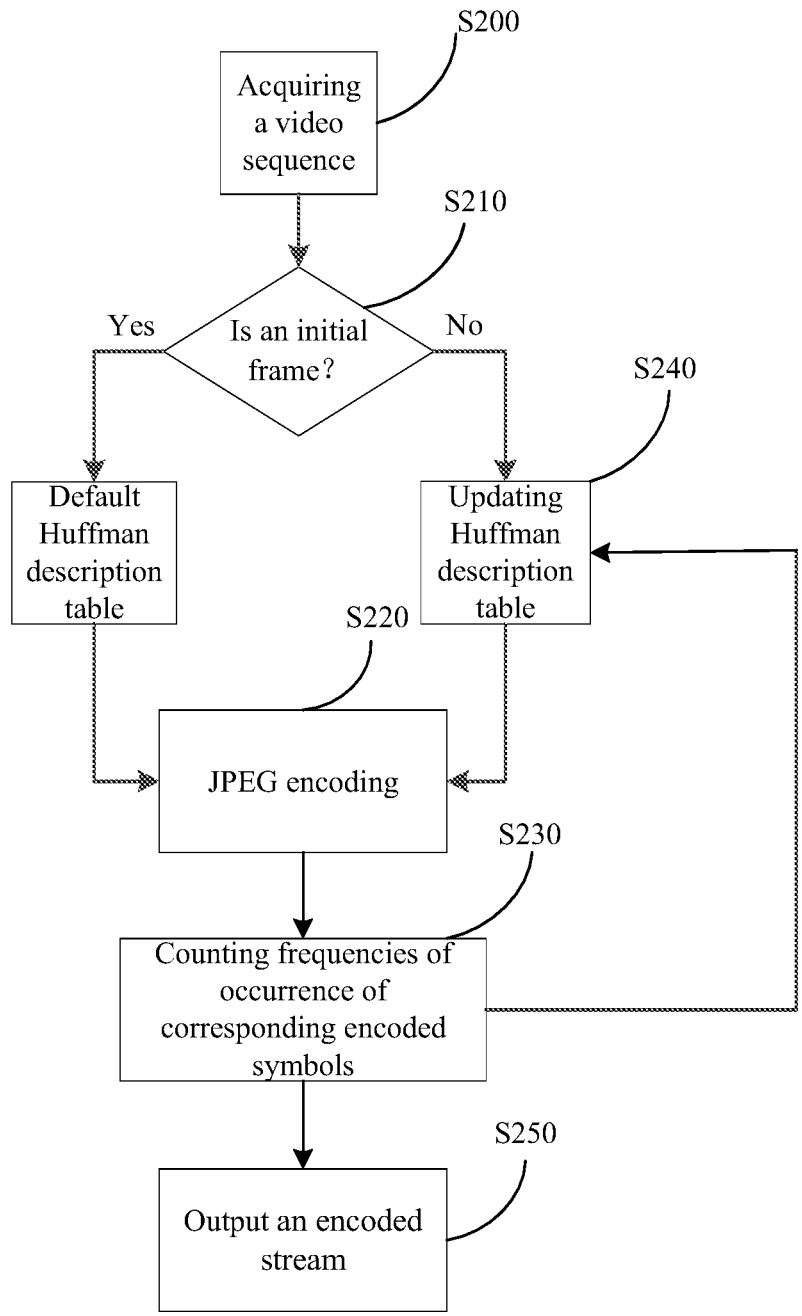
FIG. 2 is a flow diagram illustrating an adaptive Motion JPEG encoding method according to another embodiment of the present disclosure.

In another embodiment, as shown in FIG. 2, an adaptive Motion JPEG encoding method includes:

S200, acquiring a video sequence;

S210, determining whether the current video frame is an initial frame;

S220, encoding, when the current video frame is the initial frame, the current video frame into JPEG format based on a default Huffman description table (which is usually a standard Huffman description table); and encoding, when the current video frame is not the initial frame, the current video frame into JPEG format based on a updated Huffman description table;

S230, counting, while performing the step S220, the frequencies of occurrence of the corresponding encoded symbols generated after the current video frame being encoded into JPEG format;

S240, encoding the encoded symbols corresponding to the current video frame with Canonical Huffman encoding to acquire encoding bit lengths of the corresponding encoded symbols based on the frequencies of occurrence of the encoded symbols corresponding to the current video frame, and updating the Huffman description table based on the acquired encoding bit lengths; and S250, outputting an encoded stream of the current video frame.

Then, acquire a next video frame adjacent to the current video frame, and repeat steps S210 to S250. Each video frame of the video sequence will be encoded into JPEG format.

In the embodiment, the video frames are encoded as follows. A video sequence is acquired, and the current video frame is determined whether it to be an initial frame. As described in the above embodiment, the initial frame refers to a video frame acquired at a first time and to be encoded, not a frame absolutely first of the video sequence over time. When the current video frame is the initial frame, the current video frame is encoded into JPEG format based on a default Huffman description table (usually a standard Huffman description table), to generate encoded symbols corresponding to the initial frame and count the frequencies of occurrence of the encoded symbols corresponding to the initial frame. The bit lengths of the encoded symbols corresponding to the current video frame can be acquired based on the statistical result of the frequencies of occurrence and the Canonical Huffman encoding. The Huffman description table is updated based on the acquired encoding bit lengths, and the encoded stream of the current video frame is output. A next video frame adjacent to the current video frame is acquired, and encoded into JPEG format based on the updated Huffman description table. All of the following video frames of the video sequence are encoded in a similar manner.

In combination with actual encoding process, the above embodiment illuminates the adaptive dynamic change of Huffman description table between adjacent video frames. The correlation between different video frames can be fully utilized by the dynamic change of Huffman description table to eliminate redundant information. However, it would be understand by those skilled in the art that various other encoding methods can be involved in the embodiments described herein without departing from the scope and spirit of the present disclosure. Accordingly, the scope of the present disclosure is defined by the appended claims rather than the foregoing description and the exemplary embodiments described therein.

In another embodiment, when encoding the current video frame of the video sequence into JPEG format based on the Huffman description table to generate encoded symbols corresponding to the current video frame and count the frequencies of occurrence of the encoded symbols, the occurrence probabilities of the encoded symbols corresponding to the current video frame can be counted based on the statistical proportion of the encoded symbols. The Huffman description table is constructed on the basis of the frequencies of occurrence of the encoded symbols, and the arrangement of the frequencies of occurrence of encoded symbols has certain regularity in one frame image, that is, frequencies of occurrence of a part of encoded symbols in one frame image are often counted to be regarded as frequencies of occurrence of all of encoded symbols in the frame image. For this reason, in the embodiment, the frequencies of occurrence of a part of the encoded symbols corresponding to the current video frame are counted, that is, a proportion (statistical proportion of the encoded symbols) is provided for the statistical quantity of the encoded symbols, and the frequencies of occurrence of a part of the encoded symbols corresponding to the current video frame take the place of the frequencies of occurrence of all of the encoded symbols corresponding to the current video frame, so that the Huffman description table based on the current video frame can be constructed on the basis of the occurrence probabilities of part of the encoded symbol, to be used for the encoding of the next video frame adjacent to the current video frame. In the embodiment, the correlation between the adjacent video frames can be fully utilized to improve the video compression efficiency. In addition, during the video frame encoding process, the corresponding Huffman description table is allowed to be constructed without waiting for the end of the encoding of the current video frame, so the encoding process of the current video frame and the establishment of the Huffman description table will proceed in parallel, to make maximum encoding efficiency of the JPEG encoding unit, and reduce latency effect during encoding while further improving the video compression efficiency. The embodiment will be further illustrated by reference to the sequence diagram shown in FIG. 3. As shown in the figure, before the end of the encoding of the current vide frame, the frequencies of occurrence of part of the encoded symbols corresponding to the current video frame are counted for statistics. After the statistics, a Huffman description table is constructed based on the statistical result. The time for establishing the Huffman description table is short, for example, it takes about 3 milliseconds to run a program of constructing the Huffman description table on a 160 MHz 32-bit CPU. In most applications, the encoder is designed in accordance with 30 milliseconds for compressing one frame. This shows the time for constructing the Huffman description table is much less than the time for encoding a video frame, and the time for constructing the Huffman description table can be completely covered on the timeline. When the Huffman description table has been constructed, the encoding of the current video frame may not yet be completed, and at this moment, it requires to wait the JPEG encoding unit to complete encoding for updating the Huffman description table and using the updated Huffman description table for encoding a next video frame adjacent to the current video frame. Meanwhile, after the statistics of the part of the encoded symbols corresponding to the current video frame, the statistical proportion of the encoded symbols is determined based on an output encoding bit rate of a JPEG encoding unit and/or a usage ratio of a control unit, and the determined statistical proportion of the encoded symbols is used for the statistics of the part of the encoded symbols corresponding to the next vide frame adjacent to the current video frame.

Preferably, when acquiring the statistical proportion of the encoded symbols, the DC intermediate symbol of the luminance component is regarded as a statistical object, and the ratio of the number of the DC intermediate symbols of the luminance components generated in the current video frame to the number of the DC intermediate symbols of all the luminance components corresponding to the current video frame is regarded as the value of the statistical proportion of the encoded symbols. The determination of the statistical proportion of the encoded symbols may be best understood by reference to the following description taken in conjunction with a specific example.

In the Motion JPEG encoding field, each video frame may generate corresponding encoded symbols when being encoded into JPEG format. The encoded symbol may include a DC intermediate symbol and an AC intermediate symbol. For example, when a 8×8 data block has been processed by the discrete cosine transformation and quantification, the data on the top left corner of the processed 8×8 data block is a DC coefficient which is a coefficient of the image having a frequency of zero value in frequency domain, and other 63 coefficients beyond the DC coefficient are AC coefficients each of which is a coefficient of the image having a frequency of nonzero value in frequency domain. DC coefficient is an average of pixels of a block of the image, and there is a strong association between the DC coefficients of adjacent 8×8 data blocks, so the difference between the DC coefficients of adjacent blocks is generally encoded. The DC intermediate symbol is converted from the difference between the DC coefficients, and the AC intermediate symbol is converted from the AC coefficients. When perform statistical analysis of part of the encoded symbols based on the statistical proportion of the encoded symbols, the DC intermediate symbol of the luminance component (Ydc_symbol) is preferably used as an object to set the statistical proportion for the following advantages. On the one hand, using the Ydc_symbols of a smaller number to calculate the statistical proportion of the encoded symbols may improve the statistical efficiency. For a video sequence or video frame with a certain size, a certain amount of Ydc_symbols may be given, which is less than other intermediate symbols (there are 12 kinds of DC intermediate symbols of the luminance component and 162 kinds of AC intermediate symbols of the luminance component). When perform statistical analysis of frequencies of occurrence of part of the encoded symbols based on the statistical proportion of the encoded symbols, the number of the Ydc_symbols generated at present may be actually used as a condition which can determine the statistical analysis of the frequencies of occurrence to stop, that is, the number of the Ydc_symbols to be performed statistical analysis may be determined based on the total number of the Ydc_symbols corresponding to the current video frame and the statistical proportion of the encoded symbols (equivalent to set a threshold for the Ydc_symbols to be performed statistical analysis), and when the number of the Ydc_symbols generated at present for the current video frame reaches the threshold, the statistical analysis of the frequencies of occurrence of the encoded symbols may end immediately. On the other hand, the Ydc_symbol has a good stability in the process of encoding, so using the Ydc_symbol as an object of the statistical proportion of the encoded symbols can ensure the validity and accuracy of the final statistical proportion of the encoded symbols. In the embodiment, perform statistical analysis of the encoded symbols corresponding to the current video frame based on the statistical proportion of the encoded symbols, so that the encoding process of the video frame and the construction of the Huffman description table proceed in parallel to minimize the system latency. Meanwhile, the Huffman description table based on the current video frame is used for encoding a next video frame adjacent to the current video frame, so the video compression efficiency can be improved. With the advantages of the original encoding compression efficiency being reserved, the adaptive Motion JPEG encoding method according to the embodiment can improve the flexibility of the video encoding.

Figure 3:
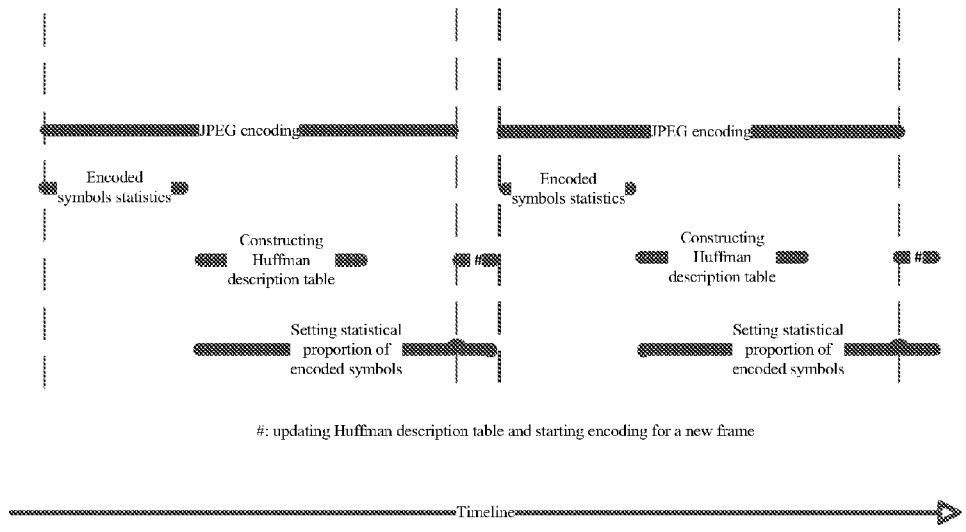
FIG. 3 is a sequence diagram illustrating an adaptive Motion JPEG encoding method according to another embodiment of the present disclosure.
Figure 4:
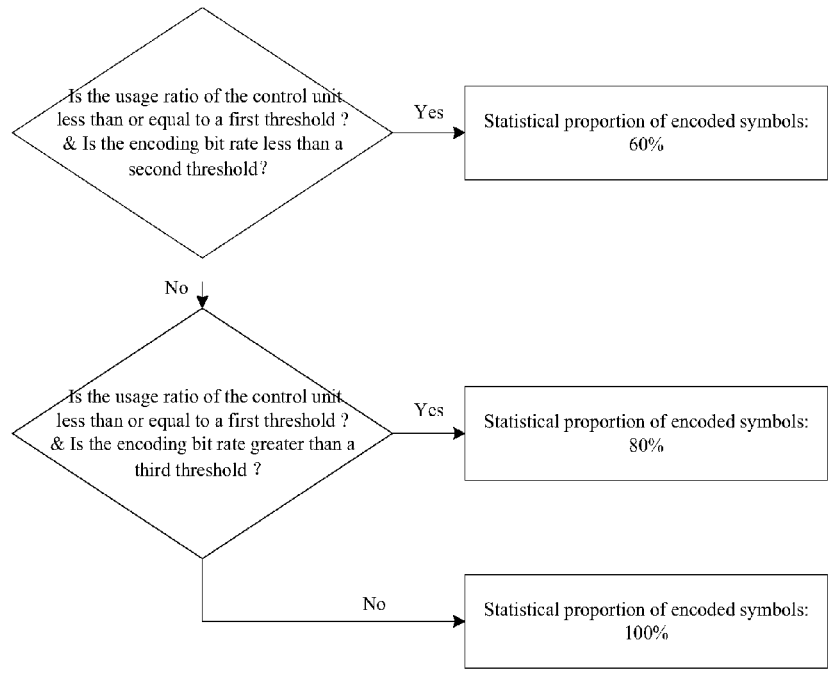
FIG. 4 is a schematic illustration of setting a statistical proportion of encoded symbols according to one embodiment of the present disclosure.

In one embodiment, as shown in FIG. 4, the statistical proportion of the encoded symbols can be determined based on the output encoding bit rate (the number of bits transmitted in unit time) of a JPEG encoding unit and the usage ratio of a control unit (such as CPU). The process of determining the statistical proportion of the encoded symbols based on the output encoding bit rate of the JPEG encoding unit and the usage ratio of the control unit will be illustrated in detail with an example of specific parameters, but it should be noted, the following description just be described in the case with only a few more specific data or parameters, so the description herein is not intended as limiting the protection scope of the present disclosure. FIG. 3 shows a process of determining the statistical proportion of the encoded symbols based on the output encoding bit rate of the JPEG encoding unit and the usage ratio of the control unit. When the usage ratio of the control unit is less than or equal to a first threshold, and the encoding bit rate is less than or equal to a second threshold, the statistical proportion of the encoded symbols is set to 60%; when the usage ratio of the control unit is less than or equal to the first threshold, and the encoding bit rate is greater than the second threshold and less than or equal to a third threshold, the statistical proportion of the encoded symbols is set to 80%; and when the usage ratio of the control unit is less than or equal to the first threshold, and the encoding bit rate is greater than the third threshold, the statistical proportion of the encoded symbols is set to 100%, that it the frequencies of occurrence of all of the encoded symbols corresponding to the current video frame are counted. Specially, when the usage ratio of the control unit is larger than the first threshold, the statistical proportion of the encoded symbols is 0%, which means performing no statistical analysis on the encoded symbols corresponding to the current video frame, and at this moment, a default Huffman description table (usually described as standard Huffman description table) is used for encoding the next video frame adjacent to the current video frame of the video sequence into JPEG format. Determining the statistical proportion of the encoded symbols based on the output encoding bit rate of the JPEG encoding unit and the usage ratio of the control unit takes a full consideration of the statistics of the encoded symbols in different conditions, which can flexibly adjust the statistical proportion of the encoded symbols according to the actual conditions to improve the efficiency of video compression. Of course, in practice, the usage ratio of the control unit or the output encoding bit rate of the JPEG encoding unit is able to be controlled to set the statistical proportion of the encoded symbols.

The statistical proportion of the encoded symbols may be any one of the above preset proportions (such as 60%, 80% and 100%). Preferably, the statistical proportion of the encoded symbols may also be dynamically changeable, for example, it is appropriate to set a different statistical proportion of the encoded symbols for the statistics of the encoded symbols of each video frame based on the output encoding bit rate of the JPEG encoding unit and/or the usage ratio of the control unit, to achieve dynamic changes of the statistical proportion of the encoded symbols. The dynamic changes of the statistical proportion of the encoded symbols is consistent with the actual condition of the statistics of the encoded symbols in encoding, thus it has a strong practicability.

Figure 5:
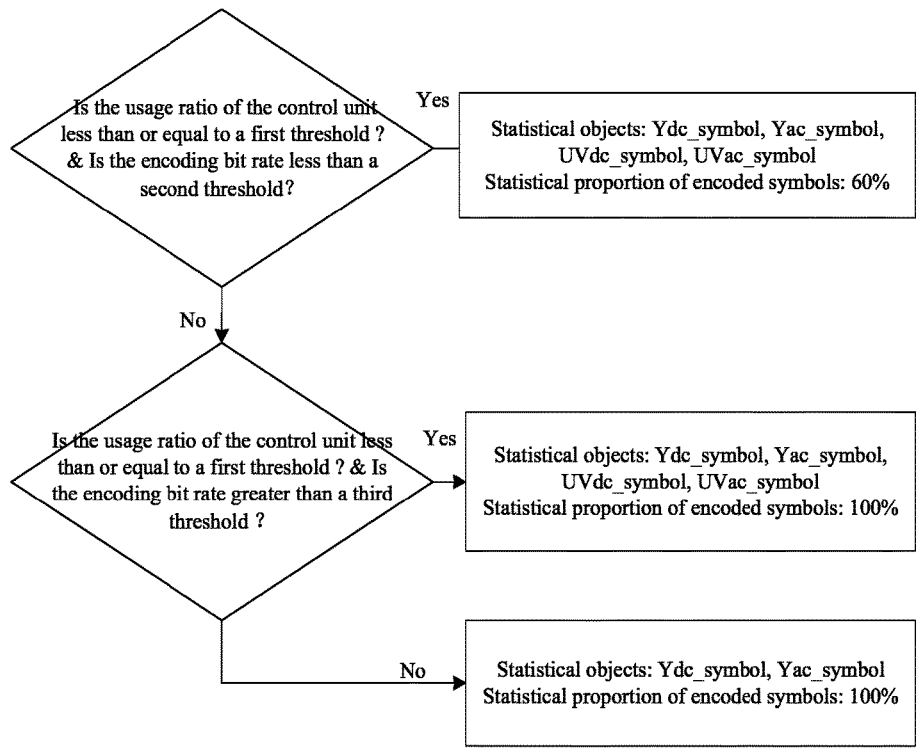
FIG. 5 is a schematic illustration of setting statistic objects of encoded symbols according to one embodiment of the present disclosure.

In addition to determine the statistical proportion of the encoded symbols based on the output encoding bit rate of the JPEG encoding unit and the usage ratio of the control unit, the statistical objects of the encoded symbol may be also determined. As shown in FIG. 5, when the usage ratio of the control unit is less than or equal to a first threshold, and the encoding bit rate is less than or equal to a second threshold, the statistical objects of the encoded symbol include the DC intermediate symbol of the luminance component (Ydc_symbol), the AC intermediate symbol of the luminance component (Yac_symbol), the DC intermediate symbol of the chrominance component (UVdc_symbol) and the AC intermediate symbol of the chrominance component as statistical objects of the encoded symbol (UVac_symbol); when the usage ratio of the control unit is less than or equal to the first threshold, and the encoding bit rate is greater than the second threshold and less than or equal to a third threshold, the statistical objects of the encoded symbol include Ydc_symbol, Yac_symbol, UVdc_symbol and UVac_symbol; and when the usage ratio of the control unit is less than or equal to the first threshold, and the encoding bit rate is greater than the third threshold, the statistical objects of the encoded symbol include Ydc_symbol and Yac_symbol. Similar to the determination of the statistical proportion of the encoded symbols, when the usage ratio of the control unit is larger than the first threshold, perform no statistical analysis on the encoded symbols corresponding to the current video frame, and use a default Huffman description table for encoding the next video frame adjacent to the current video frame of the video sequence into JPEG format. The usage ratio of the control unit is different when the control unit constructs a Huffman description table based on different statistical objects. At this moment, the different statistical objects of the encoded symbols are closely associated with the output encoding bit rate of the JPEG encoding unit. The Huffman description table established based on different frequencies of occurrence of the encoded symbols play different roles of the encoding bit rate, so when the output encoding bit rate of the JPEG encoding unit is high, the statistical objects of the encoded symbol can be set (for example, as only including the DC intermediate symbol and the AC intermediate symbol of the luminance component) to adjust the output encoding bit rate, to balance the load of the system.

The video frame may generate corresponding encoded symbols when being encoded into JPEG format. The encoded symbol may include a DC intermediate symbol and an AC intermediate symbol. The Huffman description table generated according to Canonical Huffman encoding is closely related to the frequencies of occurrence of the above two intermediate symbols. For a 8×8 data block, the DC intermediate symbol may have 12 values, and the AC intermediate symbol may have 162 values. A table about the values of the DC intermediate symbol and the AC intermediate symbol is regarded as a code value table, and a table about the encoding bit lengths of the DC intermediate symbol and the AC intermediate symbol is regarded as a code length table. The code value table and the code length table together form a Huffman description table, which are used to simulate the establishment of the Huffman tree during the process of encoding.

In one embodiment, the processes of updating the Huffman description table with Canonical Huffman encoding based on the frequencies of occurrence of the encoded symbols corresponding to the current video frame may include updating the code value table and the code length table respectively based on the encoding bit length of the encoded symbols corresponding to the current video frame.

In one exemplary embodiment, the code values of the encoded symbols corresponding to the current video frame are arranged in order of the encoding bit length (for example, from the minimum encoding bit length to the maximum encoding bit length) to obtain a updated code value table.

In one exemplary embodiment, the encoding bit lengths of the encoded symbols corresponding to the current video frame are limited based on a default code length threshold, and a updated code length table may be obtained based on the limited encoding bit lengths of the encoded symbols As an exemplary embodiment with the Canonical Huffman encoding, the default code length threshold may be 16.

The following exemplary embodiment may illuminate the process of dynamic update of the Huffman description table in detail. In the embodiment, a video sequence of Amazon [1280×720].yuv of 2445 frames may be acquired, in which each frame has a width of 1280 and a height of 720.

Figure 6:
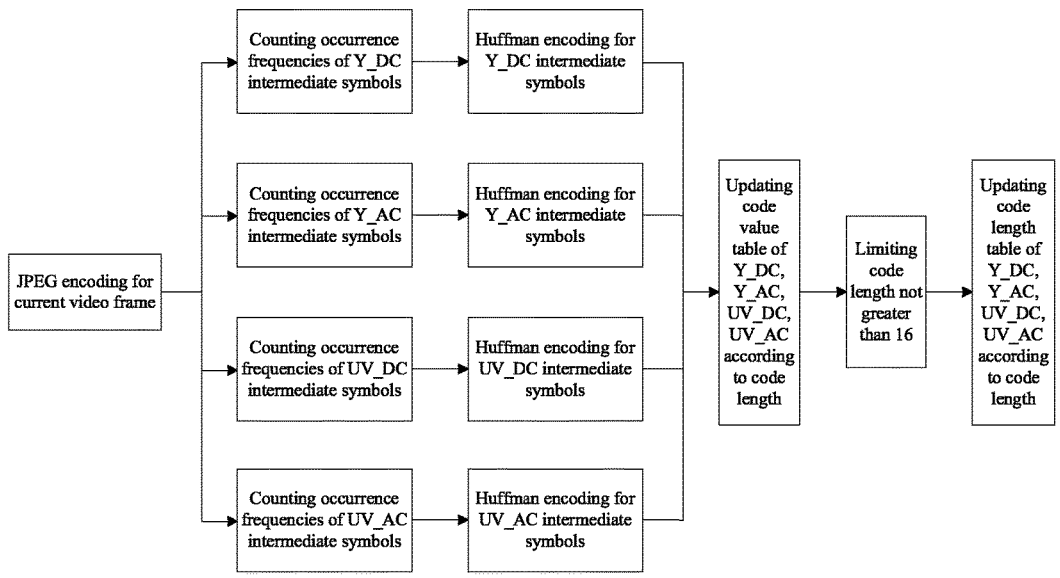
FIG. 6 is a schematic diagram illustrating a process of acquiring a corresponding encoding bit length based on an occurrence frequency of an encoded symbol corresponding to the current video frame.

The luminance and chrominance are major parameters of video display, and should be paid much attention in video encoding and decoding. During actual Huffman encoding, there are 12 kinds of DC intermediate symbols of luminance component Y (Ydc_symbol), there are 12 kinds of DC intermediate symbols of chrominance component U and chrominance component V (UVdc_symbol), there are 162 kinds of AC intermediate symbols of luminance component Y (Yac_symbol), and there are 162 kinds of AC intermediate symbols of chrominance component U and chrominance component V (UVac_symbol). Four arrays including a Ydc_values_cnt [13], a UVdc_values_cnt [13], a Yac_values_cnt [163] and a UVac_values_cnt [163] can be defined in programming code to store the frequencies of occurrence of the intermediate symbols of the luminance component Y, the chrominance component U and chrominance component V respectively. In order to avoid a codeword of all "1" in the following Huffman encoding, each array has an additional storage location of an element to reserve a code point, and the frequency of the location is always 0. As shown in FIG. 6, the current video frame is encoded into JPEG format to generate encoded symbols corresponding to the current video frame (including DC intermediate symbols and AC intermediate symbols of the luminance components, DC intermediate symbols and AC intermediate symbols of the chrominance components U, and DC intermediate symbols and AC intermediate symbols of the chrominance components V), and the frequencies of occurrence of the encoded symbols corresponding to the current video frame are counted for statistics. The encoded symbols are encoded with Canonical Huffman encoding based on the frequencies of occurrence of the encoded symbols corresponding to the current video frame to acquire the encoding bit lengths of the encoded symbols, and the code value table and the code length table of the encoded symbols corresponding to the current video frame are updated based on the encoding bit lengths, to achieve the dynamic update of the Huffman description table. The following description will illuminate the processes of acquiring the encoding bit lengths of the encoded symbols corresponding to the current video frame and updating the Huffman description table with reference to an actual encoding method. The following description refers to the AC intermediate symbol of the luminance component Y of the current video frame. The DC intermediate symbol of the luminance component Y, the AC intermediate symbols of the chrominance component U and the chrominance component V, and the DC intermediate symbols of the chrominance component U and the chrominance component V may be processed according to the process of the AC intermediate symbol of the luminance component Y.

Figure 7:
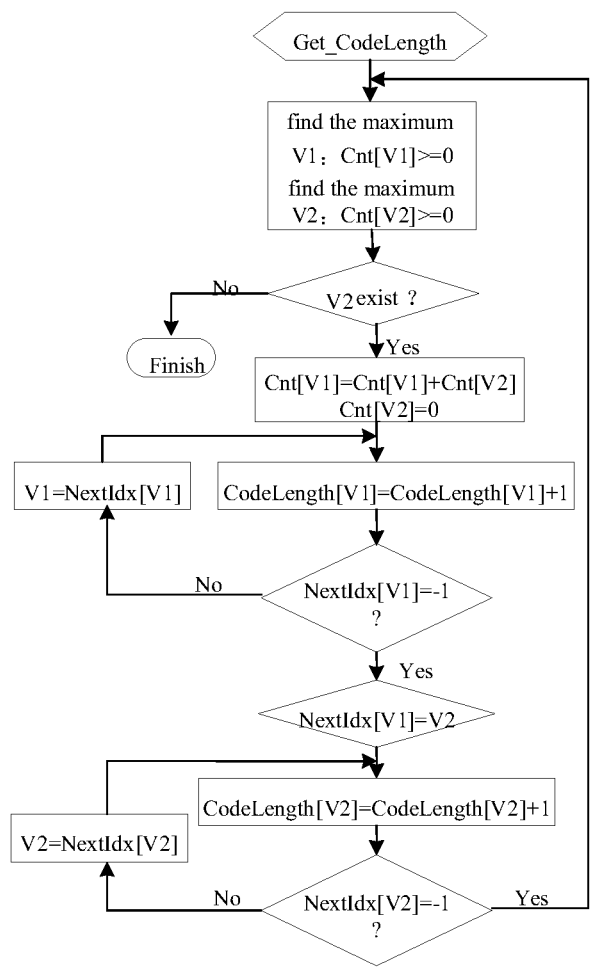
FIG. 7 is a schematic diagram illustrating a process of Canonical Huffman encoding.

FIG. 7 is a schematic diagram illustrating a process of Canonical Huffman encoding in Motion JPEG encoding which is intended to acquire encoding bit lengths of the encoded symbols with Canonical Huffman encoding based on the frequencies of occurrence of the encoded symbols corresponding to the current video frame. The Yac_values_cnt [163] includes 163 frequencies of occurrence of the AC intermediate symbols, in which Yac_values_cnt [163]=0 is the reserved code point, and the occurrence frequency of the intermediate symbol which is not appeared during the statistical process is also 0. Three arrays including Cnt [V], Encodinglength [V] and NextIdx [V] are defined in the Huffman encoding respectively, in which Cnt [V]=Yac_values_cnt [V], Encodinglength [V] represents the code size of the symbol V which is initialized to 0, and NextIdx [V] represents an index pointing to a next symbol of a chain consist of all the symbols in the current code tree which is initialized to −1 and means ending the index chain when it is −1. When look up the Cnt [V] for a minimum value, make sure the value of V is a maximum and the value of the Cnt [V] is a minimum, and make sure the value of Cnt [V] is larger or equal to 0. The point is that when a plurality of V appear with the same frequency, the occurrence frequency with the maximum V is always selected, so as to ensure the reserved code point belongs to the kind of the longest codeword, and ensure there is no codeword of all "1".

Figure 8:
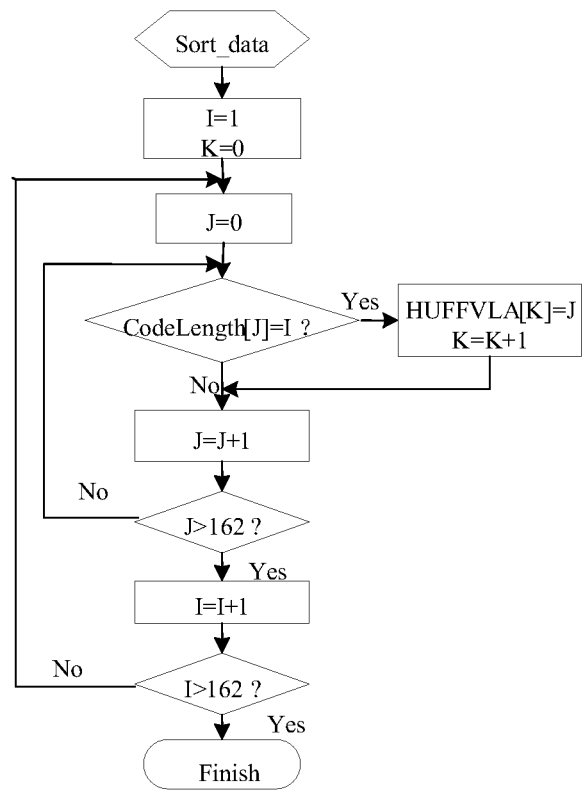
FIG. 8 is a schematic diagram illustrating a process of updating a code value table.

After the encoding bit lengths of the 162 AC intermediate symbols of each luminance component Y being determined, the code value table of the current video frame is updated based on the process of updating the code value table of the AC intermediate symbols of the luminance component Y shown in FIG. 8. Specifically, The code values of the encoded symbols are arranged from smallest to largest according to the encoding bit lengths corresponding to the encoded symbols.

Figure 9:
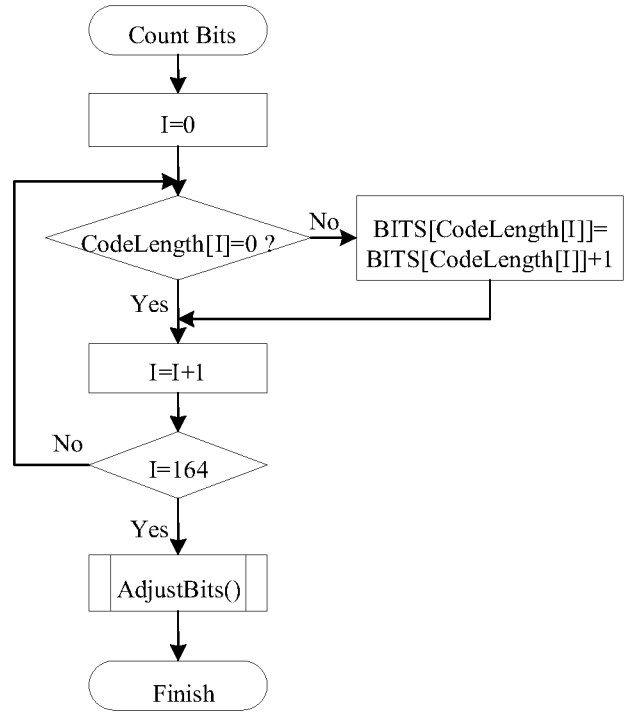
FIG. 9 is a schematic diagram illustrating a process of updating a code length table.
Figure 10:
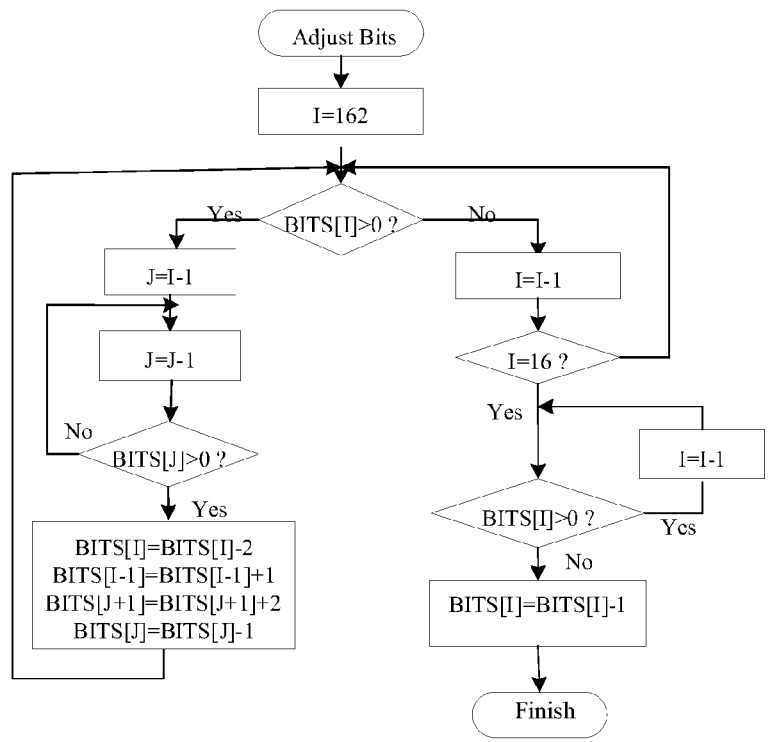
FIG. 10 is a schematic diagram illustrating a process of limiting a encoding bit length.

FIG. 9 is a schematic diagram illustrating a process of updating a code length table of the AC intermediate symbol of the luminance component Y. The code length table BITS [V] represents the number of encoded symbols of which the encoding bit length is V in the 162 AC intermediate symbols of the luminance component Y. If take the temporary code point into account, there are 163 kinds of AC intermediate symbols of the luminance component Y. Specially, the BITS [0] is 0. During the process of Motion JPEG encoding, the largest encoding bit length of the Huffman description table about the encoding bit length used in the Canonical Huffman encoding may not be greater than the default code length threshold, that is, the encoding bit lengths of all the encoded symbols is limited to be less than or equal to the default code length threshold. As a preferable embodiment, when the default code length threshold is 16, the encoding bit lengths of all the encoded symbols should be limited to be less than or equal to 16. The process of limitation can be achieved by the method shown in FIG. 10, wherein the principle is that: symbols appear in pairs for the longest Huffman code, so two symbols are removed from the length table for every time. The prefix (at least 1 bit) of the pair of symbols is divided to be used for one symbol of the pair of symbols, and the codewords in the entry of the next shortest nonzero BITS is converted into a prefix of two codewords. When the BITS table is compressed to have a maximal bit width of 16, the reserved code point is removed from the count value of the code length. With this, the code length table of the AC intermediate symbol of the luminance component Y has been updated.

As mentioned above, the processes of updating the Huffman description table with the Canonical Huffman encoding based on the frequencies of occurrence of the encoded symbols corresponding to the current video frame have been described in detail with the accompanying drawings. The above description only illuminates one encoded symbol of the current vide frame (i.e., the AC intermediate symbol of the luminance component Y), but it is to be understood that the processes of other encoded symbols of the current video frame and the processes of the encoded symbols corresponding to other video frames of the video sequence may be implemented by the reference of the processes of the AC intermediate symbol of the luminance component Y.

In order to further verify the effectiveness of the video compression of the adaptive Motion JPEG encoding method according to the present disclosure, the actual compression results of the Motion JPEG encoding method based on the standard Huffman description table (standard Motion JPEG encoding method) and the adaptive Motion JPEG encoding method according to the present disclosure are compared herein. 100 video frames in a video sequence of Amazon [1280×720].yuv are encoded by the above two methods respectively. The size and compression ratio of the encoded compressed file are shown in Table 1, in which, S_01 is the size of the compressed file encoded by the standard Motion JPEG encoding method, and the S_02 is the size of the compressed file encoded by the adaptive Motion JPEG encoding method. The ratio of the difference between the numbers of bytes of the compressed files encoded by the two encoding methods respectively to the number of bytes of the compressed files encoded with the standard Huffman description table is Compression_Ratio_02. It can be seen from Table 1 that the adaptive Motion JPEG encoding method has a better video compression result compared with the standard Motion JPEG encoding method in conventional technology.

TABLE 1

| Video Sample | S_01 | S_02 | Compression_Ratio_02 |
|---|---|---|---|
| Amazon[1280 × 720].yuv | 5.91 MB | 4.93 MB | 16.58% |

On this basis, in order to further illuminate that the adaptive Motion JPEG encoding method has a better compression result for any of different types of video sequence, Table 2 shows results of different video samples encoded by the standard Motion JPEG encoding method and the adaptive Motion JPEG encoding method. As shown in FIG. 2, each video sample has 100 video frames to be encoded. Data in Table 2 shows the compression result. On the one hand, for the video sample in which there is a little motion in the images, the compression ratio encoded by the adaptive Motion JPEG encoding method is generally about 5% to 9%, and the compression ratio may be up to 12% for sane video samples, so the adaptive Motion JPEG encoding method can significantly enhance the compression ratio compared with the standard Motion JPEG encoding method. On the other hand, for the video samples of 720p or 1080p, the compression ratio encoded by the adaptive Motion JPEG encoding method is mostly 10% to 30%, so the encoding efficiency has a great degree of improvement.

TABLE 2

| Video Sample | S_01 | S_02 | Compression_Ratio_02 |
|---|---|---|---|
| ducks_take_off[1280 × 720].yv12 | 15.8 | 15.3 | 0.0316457 |
| bridge_close[352 × 288].yv12 | 1.47 | 1.38 | 0.06122449 |
| Robotica[1440 × 1080].yuv | 6.75 | 4.95 | 0.266666667 |
| football[352 × 288].yv12 | 1.47 | 1.42 | 0.034013605 |
| foreman[352 × 288].yv12 | 1.26 | 1.2 | 0.047619048 |
| highway[352 × 288].yv12 | 0.97 | 0.85 | 0.12371134 |
| blue_sky[1920 × 1080].yv12 | 19.4 | 18.3 | 0.056701031 |
| bowing[352 × 288].yv12 | 0.95 | 0.86 | 0.094736842 |
| Speed[1440 × 1080].yuv | 14.4 | 13.3 | 0.076388889 |
| Stormchasers[1440 × 1080].yuv | 6.5 | 4.54 | 0.301538462 |
| To_The_Limit[1440 × 1080].yuv | 10.7 | 9.5 | 0.112149533 |
| Amazing_Caves[1440 × 1080].yuv | 6.81 | 5.04 | 0.259911894 |
| Amazon[1440 × 1080].yuv | 8.91 | 7.27 | 0.184083651 |
| FighterPilot[1280 × 720].yuv | 4.73 | 3.61 | 0.236786169 |

In actual JPEG encoding, besides the standard Motion JPEG encoding method, there is another method which scans the same video frame twice to generate the Huffman description table used for the encoding of the video frame. Since the encoding method can establish a Huffman tree for encoding more accurately, it is a encoding method having a relatively ideal compression result. The comparison of compression ratios of the encoding of different types of video samples based on the Motion JPEG encoding method with Huffman description table generated by scanning twice and the adaptive Motion JPEG encoding method will be further provided herein. As shown in Table 3, S_01 is the compression ratio encoded based on the Huffman description table generated by scanning twice, and S_02 is the compression ratio encoded by the adaptive Motion JPEG encoding method. Through the analysis of the data in Table 3, it shows that S_01 and S_02 are very close in value, which means that the compression results of the two encoding methods are similar. The method of generating the Huffman description table by scanning twice is disadvantage to practical application, which may consume huge system resource when there are a large number of video frames. The adaptive Motion JPEG encoding method according to the present disclosure may make full use of the correlation between adjacent video frames, and reduce the scanning number for each video frame while achieving a compression result close to the ideal compression result, so as to greatly save system resource.

TABLE 3

| Video Sample | Compression_Ratio_01 | Compression_Ratio_02 |
|---|---|---|
| ducks_take_off[1280 × 720].yv12 | 0.03164557 | 0.03164557 |
| bridge_close[352 × 288].yv12 | 0.06122449 | 0.06122449 |
| Robotica[1440 × 1080].yuv | 0.271111111 | 0.266666667 |
| football[352 × 288].yv12 | 0.034013605 | 0.034013605 |
| foreman[352 × 288].yv12 | 0.047619048 | 0.047619048 |
| highway[352 × 288].yv12 | 0.128865979 | 0.12371134 |
| blue_sky[1920 × 1080].yv12 | 0.056701031 | 0.056701031 |
| bowing[352 × 288].yv12 | 0.094736842 | 0.094736842 |
| coastguard[352 × 288].yv12 | 0.056962025 | 0.050632911 |
| Speed[1440 × 1080].yuv | 0.076388889 | 0.076388889 |
| Stormchasers[1440 × 1080].yuv | 0.304615385 | 0.301538462 |
| To_The_Limit[1440 × 1080].yuv | 0.114018692 | 0.112149533 |
| Amazing_Caves[1440 × 1080].yuv | 0.262848752 | 0.259911894 |
| Amazon[1440 × 1080].yuv | 0.189674523 | 0.184062851 |
| FighterPilot[1280 × 720].yuv | 0.241014799 | 0.236786469 |

Furthermore, the method of counting the frequencies of occurrence of encoded symbols for statistics based on the statistical proportion of the encoded symbols (the method of counting the frequencies of occurrence of part of the encoded symbols for statistics) is compared with the standard Motion JPEG encoding method. As shown in Table 4, S_01 (100%) represents the size of the compressed file encoded based on the standard Huffman description table; S_02 (100%) represents the size of compressed file encoded by the adaptive Motion JPEG encoding method, in which frequencies of occurrence of all of the encoded symbols corresponding to the current video frame are counted for statistics; S_02 (80%) represents the size of compressed file encoded by the adaptive Motion JPEG encoding method with a statistical proportion of the encoded symbols of 80%; and S_02 (60%) represents the size of compressed file encoded by the adaptive Motion JPEG encoding method with a statistical proportion of the encoded symbols of 60%. Data in Table 4 shows that, on the one hand, for the size of compressed file, the adaptive Motion JPEG encoding method (S_02 (100%)) has a better compression result compared with the existing compression technology (S_01 (100%)), and on the other hand, when using the frequencies of occurrence of part of the encoded symbols (such as 80%, 60%) to approximate the frequencies of occurrence of all of the encoded symbols in a frame, the adaptive Motion JPEG encoding method may still have a compression result close to the method using the frequencies of occurrence of all of the encoded symbols. This shows the method of counting the frequencies of occurrence of encoded symbols for statistics based on the statistical proportion of the encoded symbols has a substantially the same compression result as the method using the frequencies of occurrence of all of the encoded symbols. In the method of counting the frequencies of occurrence of part of the encoded symbols for statistics, the frequencies of occurrence are counted before the JPEG encoding unit has encoded the current video frame, so the Huffman description table used for the next video frame adjacent to the current video frame may be constructed in advance, to improve the compression efficiency, reduce the latency in the encoding process, and improve the flexibility of the video encoding.

TABLE 4

| Video Sample | S_01 (100%) | S_02 (100%) | S_02 (80%) | S_02 (60%) |
|---|---|---|---|---|
| 07420003-720p.yuv | 13.2 MB | 11.3 MB | 11.3 MB | 11.4 MB |
| 19160007-720p.yuv | 9.98 MB | 8.03 MB | 8.05 MB | 8.07 MB |
| PPG00081-720p.yuv | 22.6 MB | 21.4 MB | 21.4 MB | 21.5 MB |
| Tantugo_01-720p.yuv | 15 MB | 13.7 MB | 13.8 MB | 13.8 MB |
| Tantugo_02-720p.yuv | 12.3 MB | 10.7 MB | 10.7 MB | 10.7 MB |
| Tantugo_03-720p.yuv | 17.8 MB | 16.1 MB | 16.1 MB | 16.1 MB |
| 07420003-1080p.yuv | 26.6 MB | 22.2 MB | 22.3 MB | 22.4 MB |
| 19160007-1080p.yuv | 21.1 MB | 16.3 MB | 16.4 MB | 16.4 MB |
| PPG00081-1080p.yuv | 45.7 MB | 42.7 MB | 42.8 MB | 42.9 MB |
| Tantugo_01-1080p.yuv | 28.9 MB | 25.6 MB | 25.6 MB | 25.6 MB |
| Tantugo_02-1080p.yuv | 24.3 MB | 20.4 MB | 20.4 MB | 20.4 MB |
| Tantugo_03-1080p.yuv | 36.8 MB | 33 MB | 33 MB | 33 MB |
| mobcal_ter_720p.yuv | 30.9 MB | 30.3 MB | 30.3 MB | 30.3 MB |

In conclusion, compared with traditional Motion JPEG encoding methods, the adaptive Motion JPEG encoding method according to the present disclosure can make full use of the correlation between adjacent video frames in the video sequence and achieve dynamic changes of the Huffman description table between video frames, thus it can effectively reduce redundant information between video frames and improve the compression efficiency of the video encoding. Meanwhile, it generates the Huffman description table for each video frame by a single scanning, lower costs of the system, and save cost and resources. Furthermore, an encoding method of counting the frequencies of occurrence of part of the encoded symbols are provided, that is, the frequencies of occurrence of a part of the encoded symbols corresponding to the video frame takes the place of the frequencies of occurrence of all of the encoded symbols corresponding to the video frame. In this way, it can not only has a good compression result, but also make maximum encoding efficiency of the JPEG encoding unit to reduce the latency in the encoding process.

Figure 11:
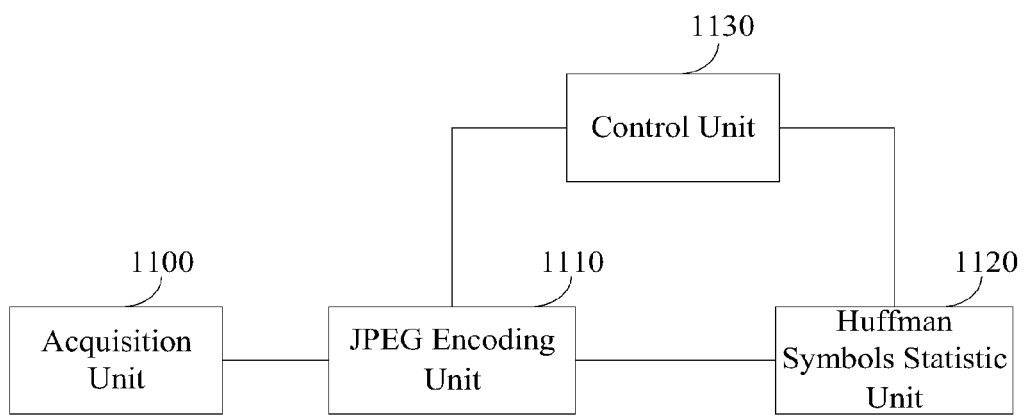
FIG. 11 is a schematic diagram illustrating an adaptive Motion JPEG encoding system according to one embodiment of the present disclosure.

An adaptive Motion JPEG encoding system is also provided. As shown in FIG. 11, The system includes:

an acquisition unit 1100, configure to acquire a video sequence;

a JPEG encoding unit 1110, configure to encode a current video frame from the video sequence output from the acquisition unit into JPEG format based on a Huffman description table, generate encoded symbols corresponding to the current video frame, and output a video compression stream;

a Huffman symbols statistic unit 1120, configured to count the frequencies of occurrence of the encoded symbols corresponding to the current video frame; and a control unit 1130, configured to update the Huffman description table with Canonical Huffman encoding based on the frequencies of occurrence of the encoded symbols corresponding to the current video frame, so that the updated Huffman description table is used for encoding a next video frame adjacent to the current video frame of the video sequence into JPEG format.

In the above encoding system, all constituent units have the function of data storage. For example, the JPEG encoding unit 1110 may store the encoded symbols generated when the video frame has been encoded, and the Huffman symbols statistic unit 1120 may store the statistical information of the frequencies of occurrence of the encoded symbols. Each constituent unit may have a storage unit in itself to implement the function of data storage. In addition, the JPEG encoding unit 1110 may not only encode the video sequence transferred from the acquisition unit 1100 into a compressed video stream according with the Motion JPEG compression standard, but also be integrated by and reuse the original hardware logic circuit.

The following description provided by way of non-limiting example will explain the working process of the Motion JPEG encoding system.

As shown in FIG. 11, the acquisition unit 1100 may acquire a video sequence and output the video sequence to the JPEG encoding unit 1110. The JPEG encoding unit 1110 may receive the video sequence, and encode the current video frame of the video sequence based on the Huffman description table to generate the encoded symbols corresponding to the current video frame. At the this moment, the Huffman symbols statistic unit 1120 may count the frequencies of occurrence of the encoded symbols corresponding to the current video frame for statistics, and output the statistical result to the control unit 1130. The control unit 1130 may update the Huffman description table with Canonical Huffman encoding based on the statistical result. The JPEG encoding unit 1110 may encode the next video frame adjacent to the current video frame based on the updated Huffman description table to generate encoded symbols corresponding to the next video frame. At this moment, the Huffman symbols statistic unit 1120 may count the frequencies of occurrence of the encoded symbols corresponding to the next video frame for statistics, and output the statistical result to the control unit 1130. The control unit 1130 may update the Huffman description table again based on the statistical result. The Huffman description table used by the JPEG encoding unit 1110 for encoding each of the following video frames into JPEG format is an updated Huffman description table generated after the encoding of the previous video frame adjacent to the video frame to be encoded. The encoding of each of the following video frames is the same as that of the current video frame, and not explained here. Particularly, when the current video frame acquired by the acquisition unit 1100 is an initial frame of the video sequence, the JPEG encoding unit 1110 may use a default Huffman description table (usually a standard Huffman description table) to encode the initial frame.

The Motion JPEG encoding system according to the present disclosure can achieve the encoding function based on dynamic Huffman description table between frames through the coordination between each constituent unit, make full use of correlation between adjacent video frames so as to effectively reduce the redundant information between video frames, improve the compression efficiency, lower costs of the system, and save cost and resources.

Preferably, the Motion JPEG encoding system may use a proprietary hardware module to count the frequencies of occurrence of encoded symbols during JPEG encoding, exchange data with a storage unit, such as DRAM (Dynamic Random Access Memory), and use software to generate an updated Huffman description table. The proprietary hardware module may be readily integrated by and reuse the original hardware logic circuit of the JPEG encoding unit in practical applications, so it can compress image more efficiently with high compression ratio while taking into account the software computation and hardware cost.

Figure 12:
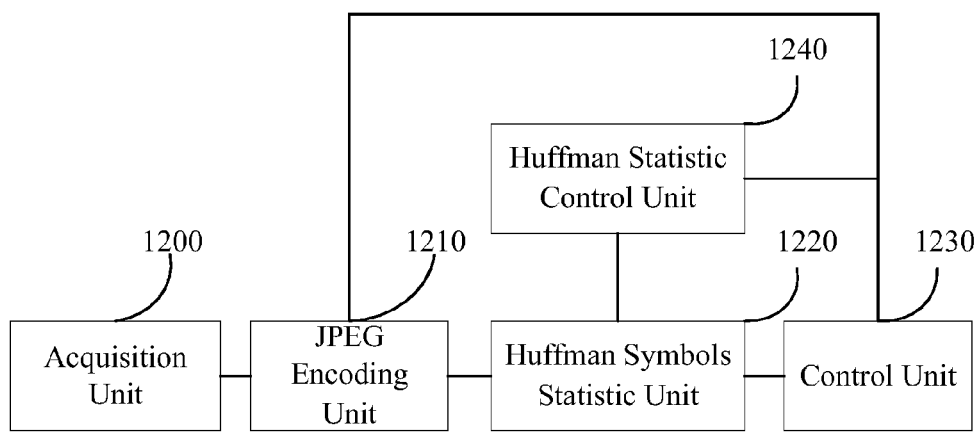
FIG. 12 is a schematic diagram illustrating an adaptive Motion JPEG encoding system according to another embodiment of the present disclosure.

In another embodiment, as shown in FIG. 12, the encoding system further includes:

a Huffman statistic control unit 1240, configured to set a statistical proportion of the encoded symbols for the Huffman symbols statistic unit, so that the Huffman symbols statistic unit counts the frequencies of occurrence of the encoding symbols corresponding to the current video frame, based on the statistical proportion of the encoded symbol.

Specifically, the acquisition unit 1200 may acquire a video sequence and output the video sequence to the JPEG encoding unit 1210. The JPEG encoding unit 1210 may receive the video sequence, and encode the current video frame of the video sequence based on the Huffman description table to generate the encoded symbols corresponding to the current video frame. When the JPEG encoding unit 1210 is encoding the current video frame, the Huffman symbols statistic unit 1220 may count the frequencies of occurrence of the encoded symbols corresponding to the current video frame for statistics based on the statistical proportion of the encoded symbols set by the Huffman statistic control unit 1220, and output the statistical result to the control unit 1230. The control unit 1230 may update the Huffman description table with Canonical Huffman encoding based on the statistical result. The JPEG encoding unit 1210 may encode the next video frame adjacent to the current video frame based on the updated Huffman description table. When the JPEG encoding unit 1210 encodes each of the following video frames, the Huffman description table used is a Huffman description table constructed by the control unit 123 after the encoding of the previous video frame adjacent to the video frame to be encoded. The encoding of each of the following video frames is the same as that of the current video frame, and not explained here. Particularly, when the current video frame acquired by the acquisition unit 1200 is an initial frame of the video sequence, the JPEG encoding unit 1110 may use a default Huffman description table to encode the initial frame, and the default Huffman description table is usually a standard Huffman description table.

In addition to improve the compression efficiency through the coordination between each constituent unit, the adaptive Motion JPEG encoding system may control the Huffman symbols statistic unit to perform statistical analysis on the encoded symbols by the Huffman statistic control unit, to construct the Huffman description table of the current video frame in advance before the current video frame has been encoded, so the control unit and the JPEG encoding unit can run in parallel, to make maximum encoding efficiency of the JPEG encoding unit, reduce system latency, and improve the performance and property and flexibility of the encoding system.

Figure 13:
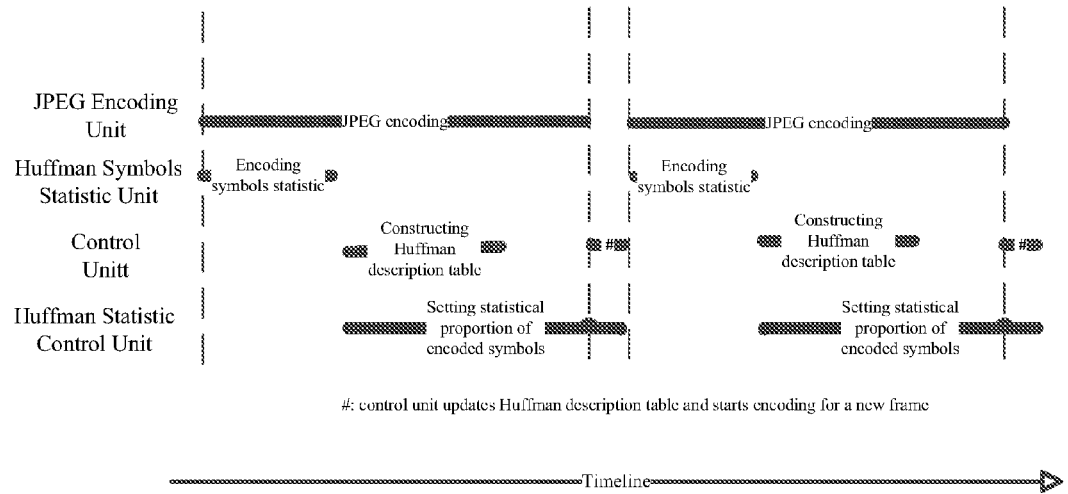
FIG. 13 is a sequence diagram illustrating an adaptive Motion JPEG encoding system according to another embodiment of the present disclosure.

The above embodiment will be further discussed in combination with FIG. 13. FIG. 13 is a sequence diagram illustrating the embodiment. As shown in the figure, before the JPEG encoding unit finishing the encoding of the current video frame, the Huffman symbols statistic unit may count the frequencies of occurrence of part of the encoded symbols corresponding to the current video frame for statistics. After the statistics, the control unit may construct a Huffman description table based on the statistical result. The time for constructing the Huffman description table is short, for example, it takes about 3 milliseconds to run a program of constructing the Huffman description table on a 160 MHz 32-bit CPU. In most applications, the encoder is designed in accordance with 30 milliseconds for compressing one frame. This shows the time taken by the control unit for constructing the Huffman description table is much less than the time taken by the JPEG encoding unit for encoding a video frame, and the time taken by the control unit for constructing the Huffman description table can be completely covered on the timeline. When the control unit has constructed the Huffman description table, the JPEG encoding unit may not finish the encoding and at this moment, the control unit is required to wait the JPEG encoding unit to complete the encoding for updating the Huffman description table and using the updated Huffman description table for encoding a next video frame adjacent to the current video frame. Meanwhile, after the Huffman symbols statistic unit has completed the statistics of the part of the encoded symbols corresponding to the current video frame, the Huffman symbols statistic unit may determine the statistical proportion of the encoded symbols based on an output encoding bit rate of the JPEG encoding unit and/or a usage ratio of the control unit, and the determined statistical proportion of the encoded symbols is used for the statistics of the part of the encoded symbols corresponding to the next vide frame adjacent to the current video frame. This shows that the encoding system including the Huffman statistic control unit can reduce the latency of the encoding system and improve the encoding efficiency Preferably, when the Huffman statistic control unit acquiring the statistical proportion of the encoded symbols, the DC intermediate symbol of the luminance component may be regarded as a statistical object and the ratio of the number of the DC intermediate symbols of the luminance components generated in the current video frame to the number of the DC intermediate symbols of all the luminance components corresponding to the current video frame is regarded as the value of the statistical proportion of the encoded symbols. The process and advantages of determining the statistical proportion of the encoded symbols by the Huffman statistic control unit are similar to the above description about the adaptive Motion JPEG encoding method, and not explained here.

As a specific embodiment, the Huffman statistic control unit determining the statistical proportion of the encoded symbols based on the output encoding bit rate of the encoding unit and the usage ratio of the control unit may take a full consideration of the statistics of the encoded symbols in actual conditions, so the statistical proportion of the encoded symbols can be determined according to actual conditions to improve the encoding efficiency of the system. Of course, in practical applications, any one of the output encoding bit rate of the encoding unit and the usage ratio of the control unit is able to be used as the basis to set the value of the statistical proportion of the encoded symbols.

Preferably, the Huffman statistics control unit may dynamically set the statistical proportion of the encoded symbols, for example, the Huffman statistic control unit may set a different statistical proportion of the encoded symbols for the statistics of the encoded symbols of each video frame based on the output encoding bit rate of the JPEG encoding unit and/or the usage ratio of the control unit, to achieve dynamic changes of the statistical proportion of the encoded symbols. The dynamic changes of the statistical proportion of the encoded symbols is consistent with the actual condition of the statistics of the encoded symbols in encoding, thus it has a strong practicability.

In another specific embodiment, the Huffman statistic control unit sets the statistical objects of the encoded symbols based on the output encoding bit rate of the JPEG encoding unit and the usage ratio of the control unit.

The process and advantages of determining the statistical objects of the encoded symbols by the Huffman statistic control unit are similar to the above description about the adaptive Motion JPEG encoding method, and not explained here.

Figure 14:
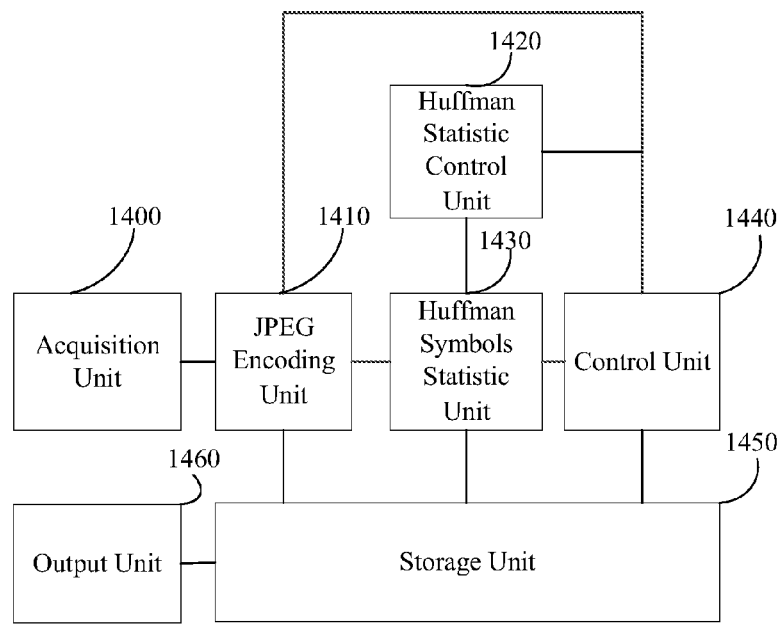
FIG. 14 is a schematic diagram illustrating an adaptive Motion JPEG encoding system according to another embodiment of the present disclosure.

In another embodiment, as shown in FIG. 14, the adaptive Motion JPEG encoding system includes:

an acquisition unit 1400, configure to acquire a video sequence;

a JPEG encoding unit 1410, configure to encode a current video frame from the video sequence output from the acquisition unit into JPEG format based on a Huffman description table, generate encoded symbols corresponding to the current video frame, and output a video compression stream of the current video frame;

a Huffman statistic control unit 1420, configured to set a statistical proportion of the encoded symbols for the Huffman symbols statistic unit, so that the Huffman symbols statistic unit counts the frequencies of occurrence of the encoding symbols corresponding to the current video frame, based on the statistical proportion of the encoded symbol;

a Huffman symbols statistic unit 1430, configured to count the frequencies of occurrence of the encoded symbols corresponding to the current video frame;

a control unit 1440, configured to update the Huffman description table with Canonical Huffman encoding based on the frequencies of occurrence of the encoded symbols corresponding to the current video frame, so that the updated Huffman description table is used for encoding a next video frame adjacent to the current video frame of the video sequence into JPEG format;

a storage unit 1450, configured to storage, exchange and transfer dada in the Motion JPEG encoding; and an output unit 1460, configured to output the compressed Motion JPEG data.

In the embodiment, the encoding system works as following: the JPEG encoding unit 1410 may receive the video sequence output from the acquisition unit 1400, encode the current video frame of the video sequence based on the Huffman description table to generate the encoded symbols corresponding to the current video frame, and output the encoded stream to the storage unit 1450; the Huffman symbols statistic unit 1430 may count the frequencies of occurrence of part of the encoded symbols (including DC intermediate symbols and AC intermediate symbols) corresponding to the current video frame for statistics based on the statistical proportion of the encoded symbols set by the Huffman statistic control unit 1420, and output the statistical result to the storage unit 1450; and the control unit 1440 may acquire the statistical result from the storage unit 1450 and update the Huffman description table with Canonical Huffman encoding, output the updated Huffman description table to the storage unit 1450, and inform the JPEG encoding unit 1410 to store the updated Huffman description table in a custom Huffman tag field of the next video frame adjacent to the current video frame. The role of the custom Huffman tag field is that when the decoder acquires the custom Huffman tag field, the decoder can establish a corresponding Huffman tree for the decoding of the corresponding video frame. When the acquisition unit 1400 acquires a next video frame adjacent to the current video frame, the JPEG encoding unit 1410 may encode the next video frame based on the updated Huffman description table. And the like, each of the following video frames is encoded based on a Huffman description table generated by the previous video frame. When all of the vide frames of the vide sequence have been encoded, the output unit 1460 may receive the compressed video stream according with the Motion JPEG compression standard from the storage unit 1450 and output the compressed video stream.

In the embodiment, the storage unit 1450 is adapted to provide the storage, exchange and transfer of data for the JPEG encoding unit 1410, Huffman symbols statistic unit 1430 and control unit 1440. On the one hand, the storage unit 1450 can reduce separate storage units in each unit so as to reduce system complexity. On the other hand, the storage unit 1450 can facilitate the fast access to the stored data of different units to improve system efficiency. The storage unit 1450 may include at least one selected from the group consisting of DRAM (Dynamic Random Access Memory), SRAM (Static Random Access Memory) and Nand Flash (a kind of Flash Memory).

In addition, the acquisition unit 1400 may include at least one selected from the group consisting of a sensor module, a hard disk, an Nand Flash (a kind of Flash Memory) and an Nor Flash (a kind of Flash Memory).

The control unit 1440 may include a CPU.

The output unit 1460 may include at least one selected from the group consisting of Nand Flash and hard disk.

In other embodiments, any two of the acquisition unit 1400, storage unit 1450 and output unit 1460 can be integrated or reuse their hardware logic circuit, or all of the acquisition unit 1400, storage unit 1450 and output unit 1460 can be integrated into one unit to simplify the system and save hardware cost.

In the embodiment, the system may further include an input unit configured to provide continuous and stable video sequence for the acquisition unit 1400.

Preferably, the Huffman statistics control unit may be integrated by or reuse the JPEG encoding unit to simplify the encoding system and save cost.

In the above embodiments, the adaptive Motion JPEG encoding system can reduce the redundant information between video frames, based on the correlation between adjacent video frames and dynamic changes of the Huffman description table, to reduce calculation amount of software, improve compression efficiency and save system cost. Meanwhile, the adaptive Motion JPEG encoding system may control the Huffman symbols statistic unit to perform statistical analysis on the encoded symbols by the Huffman statistic control unit, to construct the Huffman description table of the current video frame in advance before the current video frame has been encoded, so the control unit and the JPEG encoding unit can run in parallel, to make maximum encoding efficiency of the JPEG encoding unit, reduce system latency, improve the performance and property and flexibility of the encoding system, and meet the requirements to the encoding system in actual encoding.

Each technical feature of the above embodiments can be combined arbitrarily. For clarity, all possible combinations of each technical feature of the above embodiment may have not been described, however, as long as there is no contradiction between the technical features of a combination, the combination should be considered to be within the scope of the present disclosure.

The embodiments are chosen and described in order to explain the principles of the disclosure and their practical application so as to activate those skilled in the art to utilize the disclosure and various embodiments, and are not intended to limit the scope of the present disclosure in any way. It would be understand by those skilled in the art that various changes and modifications can be made to the embodiments described herein without departing from the scope and spirit of the present disclosure. Accordingly, the scope of the present disclosure is defined by the appended claims rather than the foregoing description and the exemplary embodiments described therein.

What is claimed is that:

1. An adaptive Motion JPEG encoding method, comprising:
    acquiring a video sequence;
    encoding a current video frame of the video sequence into JPEG format based on a Huffman description table, generating encoded symbols corresponding to the current video frame, and counting, based on a statistical proportion of the encoded symbols, frequencies of occurrence of the encoded symbols corresponding to the current video frame,
    wherein the encoded symbol includes a DC intermediate symbol which includes a DC intermediate symbol of a luminance component, and the statistical proportion of the encoded symbols is a ratio between the number of the DC intermediate symbols of the luminance components currently generated for the current video frame and the number of the DC intermediate symbols of all the luminance components corresponding to the current video frame; and
    updating the Huffman description table with Canonical Huffman encoding based on the frequencies of occurrence of the encoded symbols corresponding to the current video frame, the updated Huffman description table being used for encoding a next video frame adjacent to the current video frame of the video sequence into JPEG format.

2. The method of claim 1, wherein the step of updating the Huffman description table with Canonical Huffman encoding based on the frequencies of occurrence of the encoded symbols corresponding to the current video frame includes:
    constructing a further Huffman description table, after counting the frequencies of occurrence of the encoded symbols based on the statistical proportion of the encoded symbols;

updating the Huffman description table with the constructed further Huffman description table, after the current video frame have been encoded into JPEG format.

3. The method of claim 1, further comprising determining the statistical proportion of the encoded symbols based on at least one of an output encoding bit rate of a JPEG encoding unit and a usage ratio of a control unit.

4. The method of claim 3, wherein the step of determining the statistical proportion of the encoded symbols based on the output encoding bit rate of the JPEG encoding unit and the usage ratio of the control unit includes:
setting a first proportion as the statistical proportion when the usage ratio of the control unit is less than or equal to a first threshold and the encoding bit rate is less than or equal to a second threshold;
setting a second proportion as the statistical proportion when the usage ratio of the control unit is less than or equal to the first threshold and the encoding bit rate is greater than the second threshold and less than or equal to a third threshold; and
setting a third proportion as the statistical proportion when the usage ratio of the control unit is less than or equal to the first threshold and the encoding bit rate is greater than the third threshold.

5. The method of claim 3, further comprising determining statistical objects of the encoded symbols based on the output encoding bit rate of the JPEG encoding unit and the usage ratio of the control unit.

6. The method of claim 5, wherein the encoded symbol includes DC and AC intermediate symbols, the DC intermediate symbol includes the DC intermediate symbol of the luminance component and a DC intermediate symbol of a chrominance component, the AC intermediate symbol includes an AC intermediate symbol of a luminance component and an AC intermediate symbol of a chrominance component, and determining the statistical objects of the encoded symbol includes:
setting the DC intermediate symbol of the luminance component, the AC intermediate symbol of the luminance component, the DC intermediate symbol of the chrominance component and the AC intermediate symbol of the chrominance component as statistical objects of the encoded symbol when the usage ratio of the control unit is less than or equal to a first threshold, and the encoding bit rate is less than or equal to a second threshold;
setting the DC intermediate symbol of the luminance component, the AC intermediate symbol of the luminance component, the DC intermediate symbol of the chrominance component and the AC intermediate symbol of the chrominance component as statistical objects of the encoded symbol when the usage ratio of the control unit is less than or equal to the first threshold, and the encoding bit rate is greater than the second threshold and less than or equal to a third threshold; and
setting the DC intermediate symbol of the luminance component and the AC intermediate symbol of the luminance component as statistical objects of the encoded symbol when the usage ratio of the control unit is less than or equal to the first threshold, and the encoding bit rate is greater than the third threshold.

7. The method of claim 1, further comprising:
storing the updated Huffman description table in a custom Huffman tag field of the next video frame adjacent to the current video frame.

8. An adaptive Motion JPEG encoding system, comprising:
an acquisition unit configure to acquire a video sequence;
a JPEG encoding unit configure to encode a current video frame of the video sequence output from the acquisition unit into JPEG format based on a Huffman description table, generate encoded symbols corresponding to the current video frame, and output a video compression stream;
a Huffman statistic control unit configured to set a statistical proportion of the encoded symbols, wherein the encoded symbol includes a DC intermediate symbol which includes a DC intermediate symbol of a luminance component, and the statistical proportion of the encoded symbols is a ratio between the number of the DC intermediate symbols of the luminance components currently generated for the current video frame and the number of the DC intermediate symbols of all the luminance components corresponding to the current video frame;
a Huffman symbols statistic unit configured to count the frequencies of occurrence of the encoded symbols corresponding to the current video frame based on the statistical proportion of the encoded symbol; and
a control unit configured to update the Huffman description table with Canonical Huffman encoding based on the frequencies of occurrence of the encoded symbols corresponding to the current video frame, the updated Huffman description table being used for encoding a next video frame adjacent to the current video frame of the video sequence into JPEG format.

9. The system of claim 8, wherein the control unit is configured to construct a further Huffman description table, after the Huffman symbols statistic unit counts the frequencies of occurrence of the encoded symbols based on the statistical proportion of the encoded symbols; and
the control unit is further configured to update the Huffman description table with the constructed further Huffman description table, after the JPEG encoding unit has encoded the current video frame into JPEG format.

10. The system of claim 8, wherein the Huffman statistic control unit is further configured to determine the statistical proportion of the encoded symbols based on at least one of an output encoding bit rate of the JPEG encoding unit and a usage ratio of a control unit.

11. The system of claim 10, wherein,
the Huffman statistic control unit is configured to set a first proportion as the statistical proportion when the usage ratio of the control unit is less than or equal to a first threshold, and the encoding bit rate is less than or equal to a second threshold;
the Huffman statistic control unit is configured to set a second proportion as the statistical proportion when the usage ratio of the control unit is less than or equal to the first threshold, and the encoding bit rate is greater than the second threshold and less than or equal to a third threshold; and
the Huffman statistic control unit is configured to set a third proportion as the statistical proportion when the usage ratio of the control unit is less than or equal to the first threshold, and the encoding bit rate is greater than the third threshold.

12. The system of claim 10, wherein the Huffman statistic control unit is further configured to determine statistical objects of the encoded symbols based on the output encoding bit rate of the JPEG encoding unit and the usage ratio of the control unit.

13. The system of claim 12, wherein the encoded symbol includes the DC intermediate symbol and an AC intermediate symbol, the DC intermediate symbol includes the DC intermediate symbol of the luminance component and a DC intermediate symbol of a chrominance component, the AC intermediate symbol includes an AC intermediate symbol of a luminance component and an AC intermediate symbol of a chrominance component, and determining the statistical objects of the encoded symbol comprises:

the Huffman statistic control unit is configured to set the DC intermediate symbol of the luminance component, the AC intermediate symbol of the luminance component, the DC intermediate symbol of the chrominance component and the AC intermediate symbol of the chrominance component as statistical objects of the encoded symbol when the usage ratio of the control unit is less than or equal to a first threshold, and the encoding bit rate is less than or equal to a second threshold;

the Huffman statistic control unit is configured to set the DC intermediate symbol of the luminance component, the AC intermediate symbol of the luminance component, the DC intermediate symbol of the chrominance component and the AC intermediate symbol of the chrominance component as statistical objects of the encoded symbol when the usage ratio of the control unit is less than or equal to the first threshold, and the encoding bit rate is greater than the second threshold and less than or equal to a third threshold; and the Huffman statistic control unit is configured to set the DC intermediate symbol of the luminance component and the AC intermediate symbol of the luminance component as statistical objects of the encoded symbol when the usage ratio of the control unit is less than or equal to the first threshold, and the encoding bit rate is greater than the third threshold.

14. The system of claim 8, wherein the JPEG encoding unit is further configured to store the updated Huffman description table in a custom Huffman tag field of the next video frame adjacent to the current video frame.

* * * * *